US009260678B2

(12) United States Patent
De Angelis (10) Patent No.: US 9,260,678 B2
(45) Date of Patent: Feb. 16, 2016

(54) INTEGRATED PROCESS FOR THE PRODUCTION OF BIOFUELS FROM DIFFERENT TYPES OF STARTING MATERIALS AND RELATED PRODUCTS

(76) Inventor: Nazzareno De Angelis, Rome (IT)

(*) Notice: Subject to any disclaimer, the term of this patent is extended or adjusted under 35 U.S.C. 154(b) by 801 days.

(21) Appl. No.: 12/374,217

(22) PCT Filed: Jul. 6, 2007

(86) PCT No.: PCT/IT2007/000490
§ 371 (c)(1),
(2), (4) Date: Nov. 6, 2009

(87) PCT Pub. No.: WO2008/010253
PCT Pub. Date: Jan. 24, 2008

(65) Prior Publication Data
US 2010/0043281 A1   Feb. 25, 2010

(30) Foreign Application Priority Data
Jul. 19, 2006   (IT) .............................. RM2006A0377

(51) Int. Cl.
| | | |
|---|---|---|
| C10L 1/19 | (2006.01) | |
| C09F 1/04 | (2006.01) | |
| C11B 1/02 | (2006.01) | |
| C11B 7/00 | (2006.01) | |
| C10L 1/02 | (2006.01) | |
| C11C 3/00 | (2006.01) | |

(52) U.S. Cl.
CPC .............. *C11B 7/0075* (2013.01); *C10L 1/026* (2013.01); *C11C 3/003* (2013.01); *C10G 2300/1011* (2013.01); *Y02E 50/13* (2013.01)

(58) Field of Classification Search
CPC ....... C11B 7/0075; C11C 3/003; C10L 1/026; Y02E 50/13; C10G 2300/1011
USPC ............ 44/385, 436, 438, 445, 388, 451, 452
See application file for complete search history.

(56) References Cited

U.S. PATENT DOCUMENTS 5,525,126 A * 6/1996 Basu et al. ...................... 44/308
6,127,560 A * 10/2000 Stidham et al. ............... 554/167

(Continued)

FOREIGN PATENT DOCUMENTS

DE            754 147 C      2/1954
EP         1 483 973 A1     12/2004

(Continued)

OTHER PUBLICATIONS

Australian Examiner's First Report dated Sep. 10, 2010 issued in Australian Patent Application No. 2007274603.

(Continued)

*Primary Examiner* — Pamela H Weiss
(74) *Attorney, Agent, or Firm* — Arent Fox LLP (57) ABSTRACT

Process for the production of biocombustible or biofuel mixtures suitable for different conditions of use, starting from refined or raw vegetable oils, including those extracted from seaweed, and/or from used food oils and animal fats, each of which is pre-treated with specific treatments in order to yield a dried refined oil. The latter then undergoes transesterification with an excess of lower alcohols or bioalcohols, and a subsequent separation into a raw glycerine-based phase and a phase containing mixtures of fatty acid alkyl esters and the excess alcohols or bioalcohols.

8 Claims, 3 Drawing Sheets

(56) References Cited

U.S. PATENT DOCUMENTS

| | | | |
|---|---|---|---|
| 2002/0013486 A1* | 1/2002 | Ergun et al. | 554/174 |
| 2003/0175182 A1* | 9/2003 | Teall et al. | 422/188 |
| 2005/0069614 A1 | 3/2005 | Tysinger | |
| 2005/0204612 A1* | 9/2005 | Connemann et al. | 44/437 |

FOREIGN PATENT DOCUMENTS

| | | | |
|---|---|---|---|
| WO | WO 02/072035 A2 | | 9/2002 |
| WO | WO 03/010323 A1 | | 2/2003 |
| WO | 1515655 A | | 7/2004 |
| WO | WO 2006/002683 A1 | | 1/2006 |
| WO | WO 2006002683 A1 * | | 1/2006 |

OTHER PUBLICATIONS

Australian Office Action dated Aug. 27, 2013 issued in Australian Patent Application No. 2012203418.

Canadian Office Action dated Dec. 30, 2013 issued in Canadian Patent Application No. 2,658,335.

Canadian Office Action dated May 27, 2013 issued in Canadian Patent Application No. 2,658,335.

Chao-Chin Lai et al., "Lipase-catalyzed production of biodiesel from rice bran oil", Journal of Chemical Technology and Biotechnology, vol. 80, pp. 331-337 (2005).

Chinese Notice on the Second Office Action dated Jul. 4, 2012 issued in Chinese Patent Application No. 200780027162.2 (with translation).

Chinese Text and Notice of the Fourth Office Action dated Sep. 27, 2013 issued in Chinese Patent Application No. 200780027162.2.

Chinese Text of the First Office Action issued in Chinese Patent Application No. 200780027162.2, 2007.

Chinese Text of the Third Office Action issued in Chinese Patent Application No. 200780027162.2, 2007.

European Official Communication dated Apr. 15, 2014 issued in European Patent Application No. 07 805 702.3-1357 with Response.

European Official Communication dated Aug. 4, 2010 issued in European Patent Application No. 07 805 702.3-1221 with Response.

European Official Communication dated Sep. 6, 2013 issued in European Patent Application No. 07 805 702.3-1357 with Response.

Indian Office Action dated May 16, 2014 issued in Indian Patent Application No. 360/DELNP/2009.

Italian Office Action dated Mar. 29, 2010 issued in Italian Patent Application No. 0001372464.

Russian Letters Patent No. 2503714 issued Jul. 10, 2014 in Russian Patent Application No. 2009105665.

Russian Office Action dated Apr. 27, 2011 issued in Russian Patent Application No. 2009105665/04(007572) (with translation).

Russian Office Action dated Jul. 12, 2012 issued in Russian Patent Application No. 2009105665/04(007572) (with translation).

* cited by examiner

INTEGRATED PROCESS FOR THE PRODUCTION OF BIOFUELS FROM DIFFERENT TYPES OF STARTING MATERIALS AND RELATED PRODUCTS

CROSS-REFERENCE TO RELATED APPLICATION

This application is a National Stage entry of International Application No. PCT/IT2007/000490, filed Jul. 6, 2007, the entire specification claims and drawings of which are incorporated herewith by reference.

The present invention concerns an integrated process for the production of biofuels and biocombustibles from different types of starting materials and the related products. More specifically, the invention concerns a process yielding new biofuel mixtures from the treatment of refined or raw vegetable oils, including those extracted from algae and/or microalgae, either seaweed or other varieties, produced in aquaculture or in thermal bioreactors, and from the treatment of animal fats and used frying oils, as well as through feeding calibrated proportions of alcohols or bioalcohols of low molecular weight into the oil-based mixture in order to obtain combustible products and ecological fuels suitable for the various environmental conditions and for the kinds of systems or engines they must be used in.

As is known, the demand for renewable, ecologically compatible energy is increasingly more pressing in view of the gradual reduction of fossil fuel reserves and of the environmental risks represented by increasing atmospheric pollution and the greenhouse effect. This is why the study and development of fuels and combustibles of biological origin has considerably increased over the last few decades. Two of the most widespread and consolidated methods for producing energy starting from biomass are bioethanol and biodiesel production.

In general, biomass means any organic substance or material directly or indirectly deriving from chlorophyll photosynthesis. Through this process, plants take in water and carbon dioxide from their environment and, through the sun's energy and the nutrients present in the soil, the water and carbon dioxide are then turned into organic material useful for the plant's growth. From a production standpoint, the most important types of biomass are forestry residues, waste products from the timber and papermaking industry, waste of zootechnics enterprises and municipal solid waste, but also vegetable materials coming from specific cultivations such as sugar beet and sugarcane, cereals and their waste products, algae and/or microalgae, aquaculture and/or in thermal bioreactors, and oleaginous seeds of plants such as soy, colza and sunflower. It is evident that, if the materials produced either directly or indirectly from these agricultural activities are used for energy applications involving combustion, then, on the one hand, the energy generated will not affect fossil fuel reserves and, on the other, the carbon dioxide produced in this combustion will be compensated, in the overall energy balance, by the carbon dioxide consumed by the relative plant of origin via the chlorophyll synthesis.

Bioethanol is produced by the anaerobic fermentation of biomasses containing sugars and/or starches, such as various cereals and their waste products, various wastes of agrofood processing and cultivations, and sugarcane and sugar beet production. Specifically, sugarcane is grown deliberately for the production of bioethanol for motor vehicles. This is particularly found in Brazil, where ethyl alcohol is the main source of fuel commonly used in internal combustion engines. Also in Europe, bioethanol has been taken into consideration as a possible petrol substitute, even if its energy yield is lower than that of petrol and a complete substitution would call for the use of specially designed engines. According to current European Union legislation, bioethanol must be used in an amount of 1% in a mixture with petrol. This percentage is destined to rise to 5% and requires making no changes to existing engines. Moreover, in some countries like France and Spain, ethyl tertiary butyl ether (ETBE), a tertiary butyl ether derived from bioethanol, is currently used in a 15% mix with petrol. Finally, in northern European countries like Sweden there are already newly designed cars circulating that are fuelled by an 85% bioethanol and 15% petrol mixture.

Biodiesel is instead meant to replace diesel fuel in motor vehicles and heating systems, and is obtained from widespread purposely grown oleaginous plants like colza and sunflower. Other starting materials include soy, maize, cotton, coconut, palm seed or linseed oils or even oils deriving from marine or other algae and/or microalgae either produced in aquaculture or in thermal bioreactors, or spent food oils such as used frying oils, and animal fats. The oils contained in these products (generally known as "combustible vegetable oil" or "pure vegetable oil") are triglycerides of fatty acids in which the fatty acid alcohol chains linked to the glycerine molecule normally contain 12-18 carbon atoms. Owing to their high viscosity, these products must be treated in order to break down the triglyceride molecules into three separate molecules, derived from fatty acids, and into a glycerine molecule. In effect, the treatment replaces the glycerine triester with three monoesters of a lower alcohol, normally methanol or ethanol, according to the following reaction, where R, R' and R" represent saturated or unsaturated alcohol chains, normally with 12-22 carbon atoms, and, in the case shown, the alcohol replacing glycerine is methanol.

There are three basic ways to produce alkyl esters for biofuels starting from oils and fats of biological origin (biolipids):
  direct base-catalysed transesterification of the biolipid.
  direct acid-catalysed transesterification of the biolipid.
  conversion of the biolipid first into fatty acids and then into lower alkyl esters.

Transesterification, which is practically an alcoholysis of the triglyceride by means of a short-chain monofunctional alcohol, mainly methanol or ethanol, is the most convenient transformation method. In particular, base-catalysed transesterification (with a homogeneous catalyst, that is, in solution in the reaction mixture) is the cheapest and currently most widespread process. It normally requires temperatures in the region of 70-130° C. and pressures of 1-1.5 bar, with a conversion yield of about 85%.

The biodiesel produced by transesterification from combustible vegetable oil thus consists of a mixture of alkyl esters, particularly methyl or ethyl esters, of fatty acids and has a more homogeneous overall composition than that of fossil diesel fuel; it also has greater biodegradability and greater oxygen content because each molecule contains an ester function, —O—CO—.

As will be clearer below, biodiesel use, if compared to fossil fuel use, enables a reduction in the gaseous emissions of engines that are considered dangerous for health. Moreover, as already noted, this use allows to bring to zero the balance of the carbon dioxide produced, thereby contributing to limiting the overall greenhouse effect in the atmosphere. This is because the $CO_2$ produced in the combustion of a certain amount of biodiesel quantitatively corresponds to the amount used in the photosynthesis in the cultures for the production of vegetable oils destined for biofuels.

According to current European legislation, biodiesel is used in amounts of 1% in a mixture with conventional diesel fuel for motor vehicles, but these amounts should shortly reach and exceed 5%. Larger amounts, even 30%, are already used in certain vehicles, such as in public transport buses. In this case, too, using up to about 30% of biodiesel in diesel engines does not need any particular technical modifications, while more recently designed engines can even be fuelled by 100% pure biodiesel.

The older biodiesel production plants using combustible vegetable oils as starting material are besed on processes in batch. They generally use only one kind of starting material and the transesterification process takes place in a single phase. As already noted, in traditional production plants, transesterification takes place at a relatively high temperature (such as 130° C.) and there is a limited recovery of the catalyst, and a methanol recovery only in the final phase of the process. Particular care is necessary to monitor the quantity of water and free fatty acids in the starting biolipid. If the level of free fatty acids or humidity is too high, there may be processes of saponification and glycerine separation at the end of the process.

With traditional processing plants, the final product obtained is a mixture of methyl esters with a high humidity and glycerine content: the glycerine obtained as a by-product has a purity ranging between 75% and 80%.

Processing plants of more recent construction operate in a continuous mode and at a lower temperature (around 70° C.), and in this case the transesterification takes place in several stages, with recovery of both methanol and ethanol, which can be recycled in the process. To accelerate the process, besides using suitable catalysts enhancing the speed and efficiency of the reaction, excess alcohol is used (normally 1:6, expressed in moles, that is, double the stoichiometric ratio) and the glycerine formed is eliminated.

The alcohol in the alkyl ester solution can be separated by distillation, while a small part remains in the aqueous solution, from which it can also be extracted.

An example of the continuous process for producing alkyl esters (in particular, methyl esters) of fatty acids deriving from vegetable oils and using homogeneous catalysis techniques with soluble bases as catalysts, such as sodium hydroxide and sodium methylate, and in which the reaction is carried out in at least two consecutive stages, is described in European patent EP 0523767 (Metallgesellschaft AG).

The fuel of biological origin which is currently referred to as biodiesel, which has been briefly described above, does not have suitable characteristics for certain final uses, including use at low temperatures. This is the case, for example, with aeronautical applications, where engines must be able to run at temperatures in the region of −70° C.

As is known, turbine engines are used both in energy production and in the aeronautical industry. Their positive features consist of their quick start-up of plants and thus the immediate availability of power, as well as good functional reliability. On the other hand, they entail considerable energy consumption and pollution, especially at maximum power levels. In the aeronautical case, the maximum power requirement of an aircraft is when taking off and landing, and this adds to air pollution.

For their characteristics, turbine power stations should be activated only to cover peak energy consumption times and emergencies, but in countries where demands for energy exceeds the availability, these power stations are used for very long periods.

Both as regards use in aviation and in power stations, besides reducing fuel consumption, it would be extremely advantageous to have fuels that can reduce pollutants emissions, and this is why also in these fields the availability of suitable fuels or combustibles of biological origin is extremely important. The possibility of diluting normal aircraft fuel with a biocompatible product of a biodiesel type, but which can be calibrated to obtain the functional characteristics suitable for use in extreme conditions as those of aircraft engines, would meet important criteria of economy and environmental protection in this field.

In view of the above, an object of the present invention is to provide a production process to obtain biofuel mixtures that can, on the one hand, be extremely flexible as regards supply of raw materials, being suitable to process any material based on animal or vegetable oil or fat including waste matter of food processing and used frying oils, while, on the other hand, offering the same high flexibility as regards the characteristics of usability of the resulting product. In particular, such product must be able to withstand the same conditions as any normal biodiesel, either in a pure state or diluted with established amounts of fossil fuel, but it must also be available for use—in more suitable quantities and proportions of its components—as fuel or as a diluent of conventional fuels, in extreme conditions, and particularly at low temperatures, or in situations where the extreme purity of emissions is a critical requirement.

To this end, the present invention proposes a process essentially based on the transesterification of vegetable oils of various origin, both raw and refined oils, of biolipids of animal origin or even lipid-based waste products of food processing, such as used frying oils. Before undergoing the transesterification process, these materials are suitably pre-treated according to the kind of starting material and its origin, and then suitably dried in order to provide a dried refined oil that is as consistent and reproducible as possible for the transesterification process. Downstream of transesterification, in the process proposed according to the present invention, the lower alcohol that is used in excess for transesterification can be completely separated from the reaction mixture and recovered, or it can be recovered in part, or may even be fed into the final mixture with a quantity of additional alcohol, of the same or different type, in order to obtain—in the final product—a calibrated quantity of one or more different lower alcohols in a mixture with the fatty acid alkyl esters resulting from the transesterification process.

The new product resulting from the aforesaid process is synthetically called "Bio-oil" to distinguish it (both in terms of intrinsic constitution and performance) from conventional biodiesel.

Thus, the present invention specifically provides a process for the production
of biocombustible and biofuel mixtures suitable for different conditions of use, comprising the following fundamental operations:
- a) producing mixtures of fatty acid alkyl esters and glycerine by transesterification, starting from lipid-based vegetable or animal materials and from lower alcohols or bioalcohols in excess;
- b) separating the mixtures deriving from the said operation a) of transesterification into a phase based on raw glycerine and a phase containing the said mixtures of fatty acid alkyl esters and the excess amount of lower alcohols or bioalcohols;

characterised by the fact that the said starting lipid-based vegetable or animal materials include one or more of the following ingredients:
- i. raw vegetable oil
- ii. refined vegetable oil
- iii. used food oil and/or animal fats and by the fact that the said ingredients undergo the following preliminary treatments upstream of said operation a) of transesterification:
1) the said ingredient i), raw vegetable oil, is subjected to a preliminary depuration and refining treatment in order to remove impurities and to neutralise and winterize it, and then to drying of the refined oil thus obtained;
2) the said ingredient ii), refined vegetable oil, is subjected to preliminary drying;
3) the said ingredient iii), used food oil and/or animal fats, is subjected to a preliminary depuration treatment, to drying and then to an esterification of the free fatty acids contained therein, by addition of lower alcohols or bioalcohols; the obtained product based on fatty acid alkyl esters is mixed in a proportion of not more than 20% with dried refined oil obtained from treatments 1) or 2) above. The said proportion is preferably 15%.

According to the present invention, after the operation b) of separation of the reaction mixture coming from transesterification, the phase containing the mixtures of fatty acid alkyl esters and the excess amount of lower alcohols or bioalcohols can be subjected to a further treatment for the separation of amounts ranging from 0 to 100%, preferably from 10 to 100%, of alcohols or bioalcohols present after operation b) of separation. In practice, the said phase may not necessarily be subjected to further separation treatments, thus keeping the whole excess quantity of lower alcohols or bioalcohols in the final product.

Alternatively, according to the uses envisaged for the product and to the environmental conditions of use, the phase containing the mixture of fatty acid alkyl esters and excess lower alcohols or bioalcohols may be added with a further quantity of lower alcohols or bioalcohols.

From the above, it results that Bio-oil is a new biofuel obtained from suitable combinations of percentages of its main components—esterified oils and alcohols/bioalcohols.

It may be used alone or as the main ingredient of a mixture, or as a biocompatible diluent in variable percentages, in relation to the characteristics and use of the apparatus it is used in and the relative environmental conditions of use (such as low temperatures), be it a turbogas engine, an internal combustion engine, a fuel cell, a burner, for applications in the fields of land, sea or air transportation, mechanical or electrical energy production or heating systems.

Preferably, the said lower alcohols or bioalcohols are selected from among methanol, ethanol, biomethanol, bioethanol and their mixtures, but the definition of lower alcohol embraces alcohols with up to 4 carbon atoms.

Preferably, the said operation a) of transesterification is carried out with an alkaline catalyst, according to what is already consolidated in biodiesel production, such as sodium or potassium hydroxide or sodium methylate. According to certain preferred embodiments of the present invention, this operation is carried out in three consecutive steps in which the said alcohols or bioalcohols and said catalyst are dosed and recycled at every passage. This operative solution is advantageous as regards yields, because it allows making the transesterification process go further.

In the process according to the present invention, the transesterification takes place continuously, preferably at a maximum temperature of 50° C. and relative pressure of 0.5 bar. As already noted, recovery of the excess alcohol takes place continuously. More specifically, the undesired alcohol in the alkyl ester solution may be separated by distillation. A small part thereof remains in the aqueous solution of raw glycerine, from which it can still be recovered later.

In view of the above, if the starting material is not already a refined oil, the integrated process proposed according to the present invention envisages a pre-treatment of depuration and refining of the starting oil, in order to arrive at a dried refined oil regardless of whether the process starts with a raw virgin oil or with used frying oils and/or animal fats. If the starting material is already a pure, already refined, vegetable oil, the only preliminary treatment envisaged before transesterification is drying.

The aforesaid preliminary treatments are intended to remove extraneous substances (proteins, rubbers, resins, phosphates, ketones, aldehydes) which may be present either in suspension or in solution and that can negatively influence the transesterification process or combustion. More specifically, in the preliminary refining of the oil, it is worth removing any lecithin and any free fatty acids, in order to obtain a starting material with consistent characteristics.

According to a preferred embodiment of the present invention, the said preliminary treatment 1) of depuration of ingredient i), i.e. raw vegetable oil, includes operations of centrifugation, filtration and mucilage removal. The depuration treatment removes most of the water, impurities in suspension and the mucilage, that can generate rubbers. In particular, centrifugation removes the water residues, coarse impurities, fragments of seeds, flours, carbon residues, and inhibits the onset of enzymatic reactions. Filtration, obtained with filter-presses, removes all the substances in suspension not removed by centrifugation. Demucilagination or degumming removes hydratable polar lipids (phospholipids, lipoprotids, glycolipids), resins and rubbers.

Still according to a preferred embodiment of the present invention, the preliminary treatment 1) of depuration of the raw vegetable oil includes neutralisation and winterizing operations. With refining there is firstly a neutralisation or de-acidification of the starting oil, enabling the removal of free fatty acids that are formed in the raw material through lipase activity. This treatment is carried out by adding suitable quantities of bases, particularly sodium hydroxide, to the raw oil. The neutralisation of the free fatty acids partly leads to forming soaps, which may incorporate considerable fractions of neutral oil.

As already noted, the integrated process according to the present invention may use biomethanol instead of methanol or bioethanol instead of ethanol, in order to obtain a product with the utmost environmental compatibility. Mixing Bio-oil with traditional fuel in suitable percentages according to the type of use and apparatus enables attributing—in the same percentages—the characteristics of environmental compatibility of Bio-oil to the resulting mixture.

According to a further aspect thereof, the present invention also provides a new biofuel or biocombustible mixture consisting of variable quantities of:

I) fatty acid alkyl esters obtainable by transesterification starting from lipid-based vegetable or animal materials subjected to preliminary treatments involving drying, and from lower alcohols or bioalcohols.

II) lower alcohols or bioalcohols or their mixtures.

According to a first possibility, the said quantity 11) of lower alcohols or bioalcohols corresponds to the excess alcohols or bioalcohols initially found in the said transesterification operation. In this case, there is no need for operations envisaging the separation of the alcohol from the alkyl ester phase produced via transesterification.

Depending on requirements of use, the quantity 11) of lower alcohols or bioalcohols may also be smaller than the excess alcohol or bioalcohol present initially in the said transesterification operation, and this means that, in production, there will be at least a partial separation of the alcohol contained in the alkyl ester mixture produced, such as by rapid evaporation (flash) of the alcohol, which is the lightest component, from the product mixture.

Alternatively, when the mixture according to the present invention must be used, for example, in extreme conditions in aeronautical applications in order to maintain Bio-oil fluidity and to avoid separations, the quantity 11) of lower alcohols or bioalcohols may be greater than the excess alcohol or bioalcohol initially present in the said transesterification operation. In which case, as noted, the final mixture is obtained by adding further alcohol or bioalcohol after the transesterification operation.

As will be evident from the data presented below, the process according to the present invention offers a product of higher quality and purity compared to conventional processes, with lower residual glycerol content and humidity, and yielding a glycerine by-product directly of 95-98% purity.

The specific features of the present invention, as well as its advantages and relative operative modalities, will be all the more evident with reference to the detailed description presented merely for exemplificative purposes below, relating to one of its preferred embodiments. The same is illustrated in the attached drawings, wherein.

Figure 1:
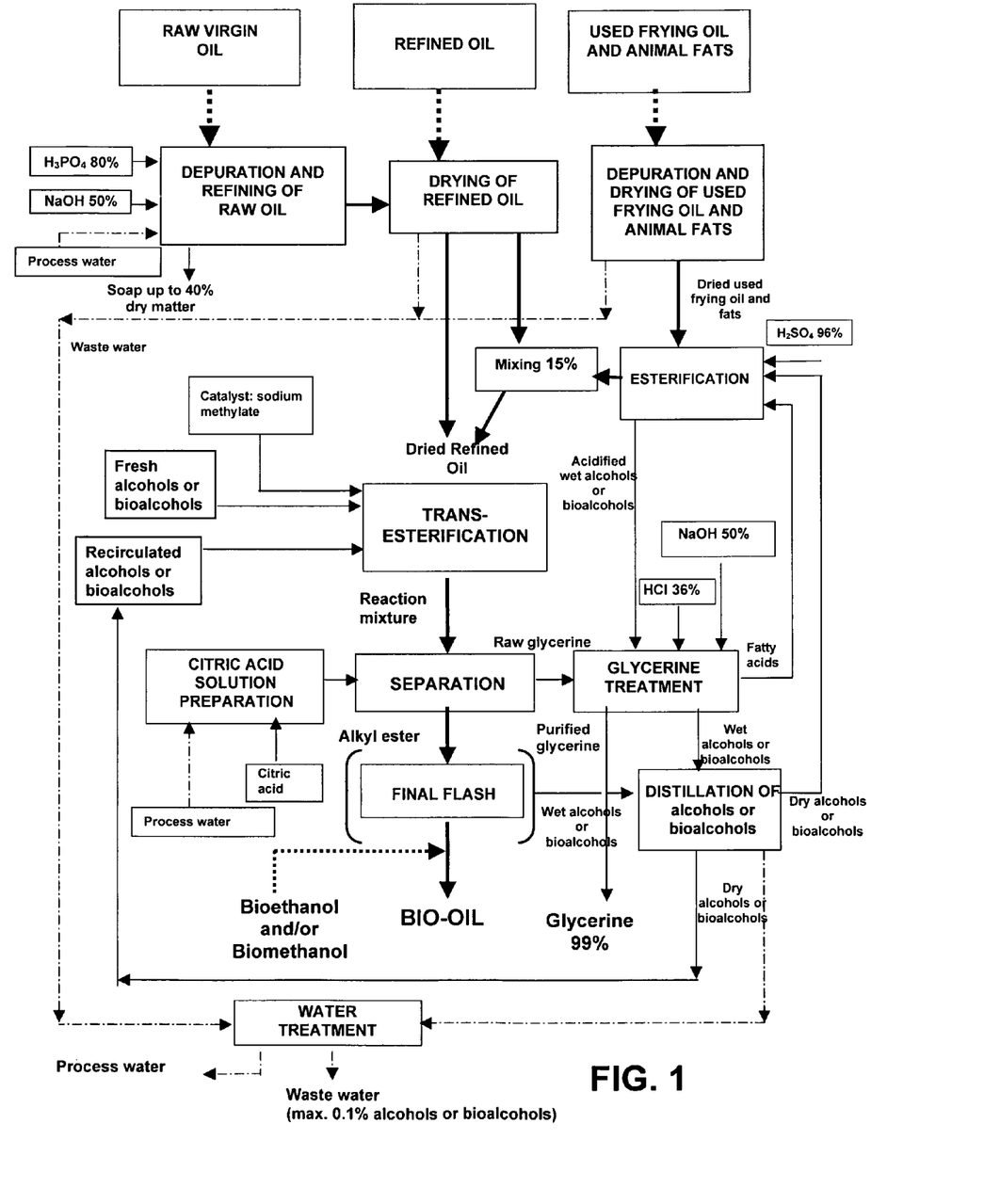
FIG. 1 shows an overall block diagram of an integrated process for the production of biofuels and biocombustibles according to the present invention.

As shown in the block diagram of FIG. 1, the process according to the present invention mainly consists of three sections of preliminary treatment of the starting material. These three sections are interconnected and can be used either together or alternatively to one another, depending on the type of starting material to be processed and on the characteristics required of the final product. According to the present invention, the oil used for the transesterification process is obtained from raw, refined or used (frying) vegetable oils and from oils of animal origin. The raw vegetable oils are extracted from oil-producing plant species (colza, sunflower, hemp, sorghum, coconut, soy, palm, etc.) or from algae and/or microalgae produced in aquaculture and/or in thermal bioreactors.

Figure 2:
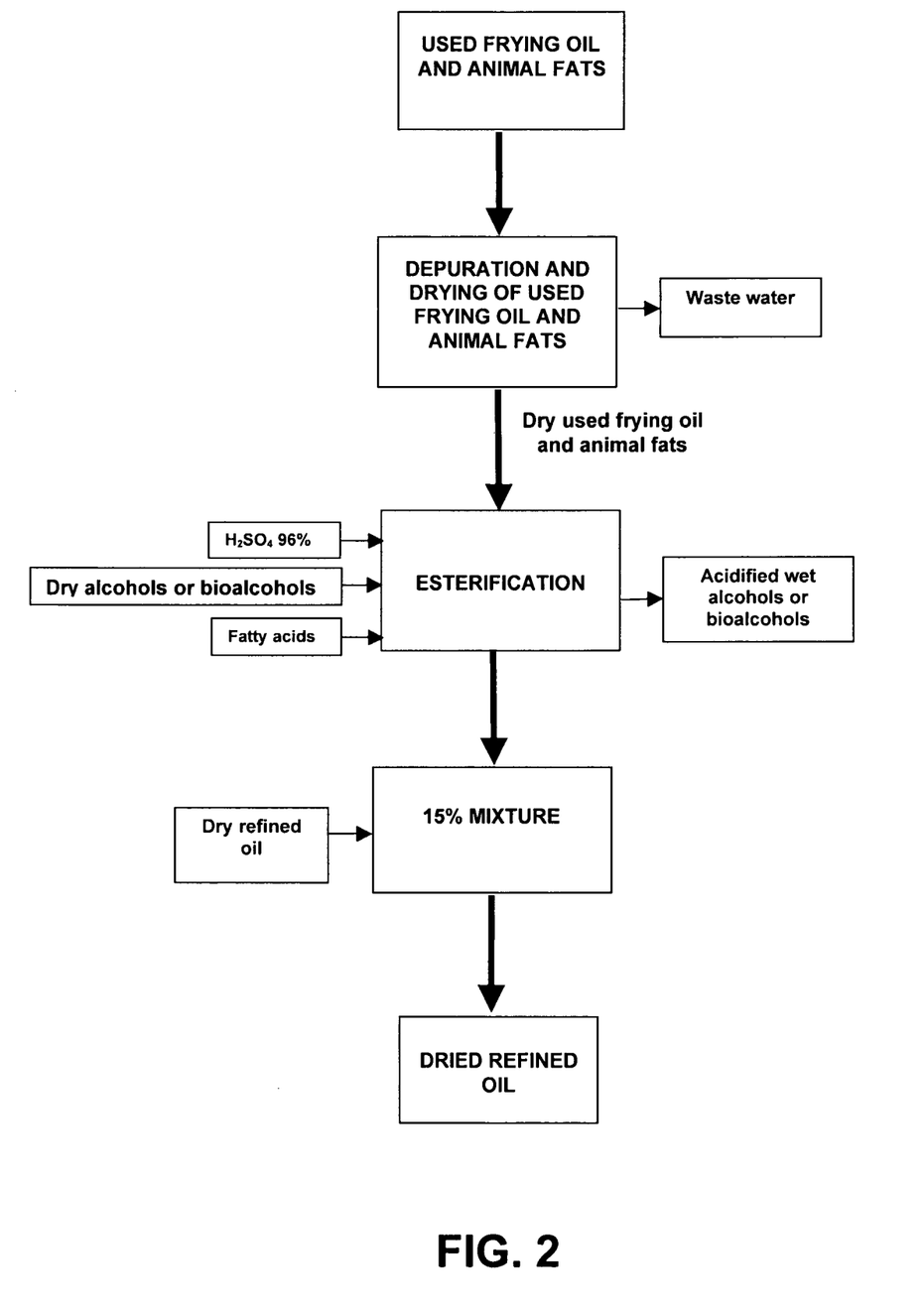
FIG. 2 shows a block diagram of only that section of the process of FIG. 1 concerning the preliminary treatment of used frying oils and animal fats.

The third section of the process, which concerns treatment of the spent food oils, is also shown in more detail in the block diagram of FIG. 2.

The production lines of all three sections converge in the point indicated as "Dried refined oil", from which the transesterification process starts, with the subsequent operations of separation and recovery of the various streams and the possible addition of lower alcohol to the Bio-oil obtained in the process.

Figure 3:
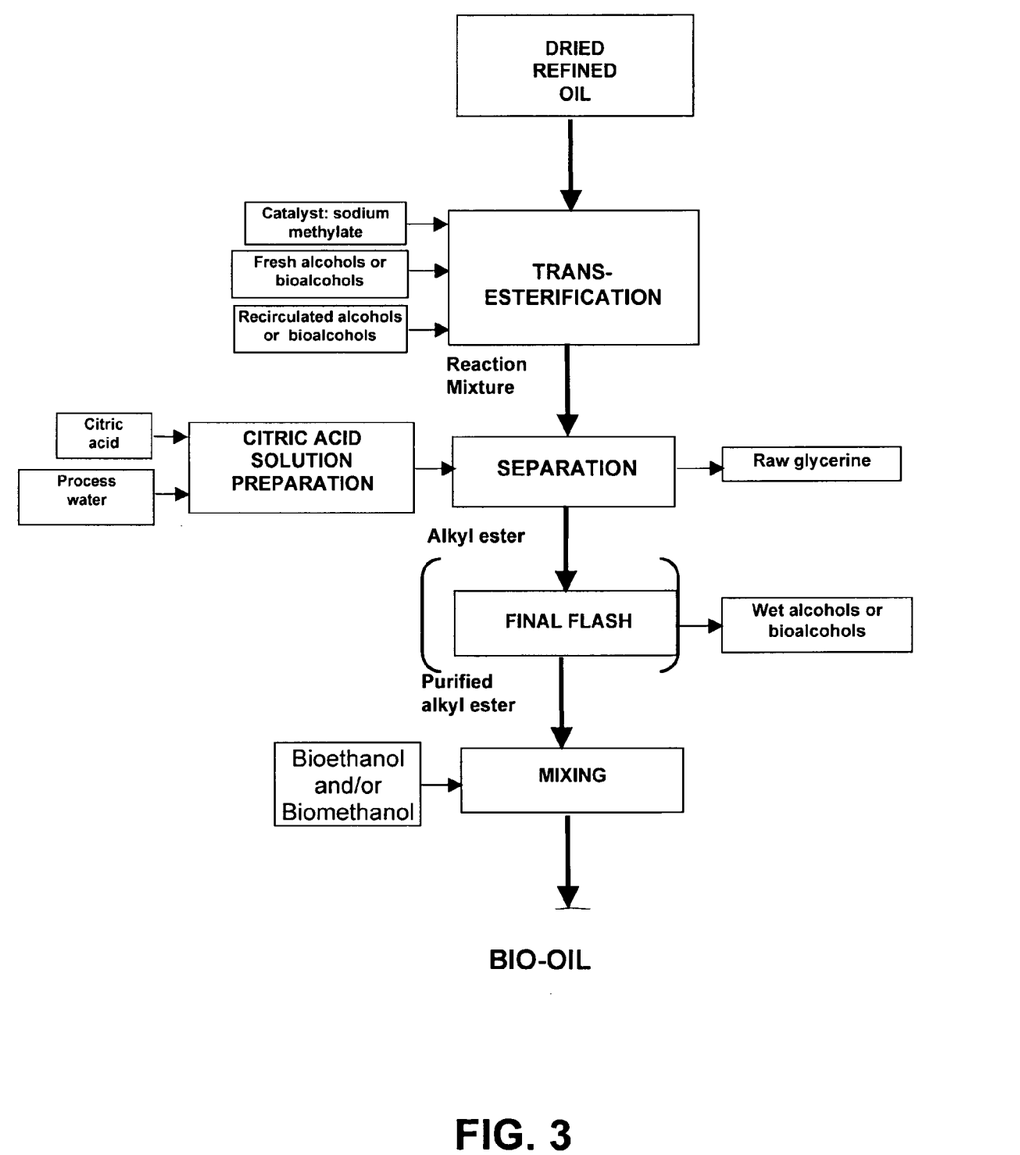
FIG. 3 shows a block diagram of that section of the process of FIG. 1 concerning the production of the mixture according to the present invention starting from pre-treated and dried oil.

The identity and preferred doses of the various reagents are shown in FIG. 1, while the central section of the process that carries out transesterification, the separation of the produced streams and any mixing with additional alcohols or bioalcohols is also shown in more detail in the block diagram of FIG. 3.

EXAMPLE

To obtain a total of 1,000 kg of Bio-oil by means of the process of the present invention, the preliminary treatment is carried out as follows.

Raw Vegetable Oil

If raw virgin vegetable oil is used as a starting material, with a starting quantity of 1,040 kg, the procedure is as follows:

a) pre-treatment of depuration;
b) pre-treatment of neutralisation with $H_3PO_4$ and NaOH in order to extract soaps and dry matter;
c) drying treatment, which yields dried refined oil.

The dried refined oil is the nodal point (at the centre of the diagram of FIG. 1) of Bio-oil production, which is the arrival point for all the starting materials taken into consideration.

Raw Vegetable Oil and Used Frying Oil

Starting from 1,039 kg of starting material, composed of 907 kg of raw vegetable oil mixed with 132 kg of used frying oil (UFO), or oil deriving from animal fats, the procedure is as follows:

a) for UFO and oil from animal fats, there is a pre-treatment of centrifugation and filtration, drying and esterification with $H_2SO_4$ and methanol/biomethanol or ethanol/bioethanol;
b) for raw vegetable oil, there is a pre-treatment of neutralisation with $H_3PO_4$ and NaOH, to extract the soaps and dry matter;
c) drying treatment yielding the dried refined oil.

Refined Vegetable Oil and Used Frying Oil

Starting from 1,009 kg of starting material, composed of 877 kg of refined vegetable oil mixed with 132 kg of used frying oil (UFO), or oil deriving from animal fats, the procedure is as follows:

a) for UFO and oil from animal fats, there is a pre-treatment of centrifugation and filtration, drying and esterification with $H_2SO_4$ and methanol/biomethanol or ethanol/bioethanol.
b) drying treatment yielding the dried refined oil.

Refined Vegetable Oil

Starting from 1005 kg of refined vegetable oil as starting material, the procedure is as follows:

a) drying treatment yielding the dried refined oil.

In the production process, starting from the various combinations of the aforesaid starting materials, after the above preliminary treatments the transesterification reaction is carried out. Then treatments of purification and extraction of undesired components, the addition of components necessary for particular uses (methanol and/or biomethanol, ethanol and/or bioethanol) are carried out, to finally arrive at Bio-oil, as shown in the diagram of the process.

To produce 1,000 kg of Bio-oil, considering the entire process, the following chemicals and relative quantities are used:

| CHEMICALS | MIN (kg) | MAX (kg) |
|---|---|---|
| Biomethanol | 0* | 450 |
| Methanol | 0* | 450 |
| Bioethanol | 0* | 450 |
| Ethanol | 0* | 450 |
| Sodium methylate | 5.0 | 10.5 |
| Citric acid | 0.5 | 1.5 |
| 96% sulphuric acid | 0.5 | 1.7 |
| 36% hydrogen chloride | 13.0 | 15.5 |
| 80% phosphoric acid | 1.5 | 3.00 |
| 50% caustic soda | 10.5 | 13.7 |

*The four products are combined according to the optimal percentages necessary for the type of starting material and for the type of Bio-oil to be produced. For minimum environmental impact, the process will use biomethanol and bioethanol in suitable proportions.

Table 1 below reports some characteristics of biodiesel for motor vehicles according to UNI EN 14 424 specifications, in comparison with the Bio-oil produced according to the procedure of the present invention.

TABLE 1

COMPARISON OF BIODIESEL AND BIO-OIL PROPERTIES

| Properties | Unit | BIODIESEL Limits Min | BIODIESEL Limits Max | BIO-OIL Limits Min | BIO-OIL Limits Max | Test method |
|---|---|---|---|---|---|---|
| Ester content | % (m/m) | 96.5 | | 98.5 | | EN 14103 |
| Volumetric mass at 15° C. | kg/m$^3$ | 860 | 900 | 860 | 900 | EN ISO 3675 |
| | | | | | | EN ISO 12185 |
| Viscosity at 40° C. | mm$^2$/s | 3.50 | 5.00 | 1.50 | 4.00 | EN ISO 3104 |
| Flash-point | ° C. | 120 | — | >110 | — | prEN ISO 3679 |
| Sulphur content | mg/kg | — | 10.0 | — | ≤10.0 | EN ISO 20846 |
| | | | | | | EN ISO 20884 |
| Carbonious residue (on 10% residue of distillation) | % (m/m) | — | 0.30 | — | ≤0.30 | EN ISO 10370 |
| Ketane number | | 51.0 | | | | EN ISO 5165 |
| Sulphated ash content | % (m/m) | — | 0.02 | | | ISO 3987 |
| Water content | mg/kg | — | 500 | — | ≤500 | EN ISO 12937 |
| Total solid contaminants | mg/kg | — | 24 | — | ≤20 | EN 12662 |
| Corrosion on copper lamina (3 h at 50° C.) | Classification | class 1 | | class 1 | | EN ISO 2160 |
| Oxidation stability, 110° C. | hours | 6.0 | — | 6.0 | — | EN 14112 |
| Acidity value | mg KOH/g | | 0.50 | | | EN 14104 |
| Iodine value | g iodine/100 g | | 120 | | 110 | EN 14111 |
| Methyl ester of linolenic acid | % (m/m) | | 12.0 | | 11.0 | EN 14103 |
| Polyunsaturated methyl esters (≥4 double bonds) | % (m/m) | | 1 | | 1 | |
| Methanol content | % (m/m) | | 0.20 | | 45.0 | EN 14110 |
| Biomethanol content | % (m/m) | | | | 45.0 | |
| Ethanol content | % (m/m) | | | | 45.0 | |
| Bioethanol content | % (m/m) | | | | 45.0 | |
| Monoglyceride content | % (m/m) | | 0.80 | | 0.70 | EN 14105 |
| Diglyceride content | % (m/m) | | 0.20 | | 0.19 | EN 14105 |
| Triglyceride content | % (m/m) | | 0.20 | | 0.20 | EN 14105 |
| Free glycerol | % (m/m) | | 0.02 | | 0.02 | EN 14105 |
| | | | | | | EN 14106 |
| Monoglyceride content | % (m/m) | | 0.80 | | 0.80 | EN 14105 |
| Diglyceride content | % (m/m) | | 0.20 | | 0.20 | EN 14105 |
| Triglyceride content | % (m/m) | | 0.20 | | 0.20 | EN 14105 |
| Free glycerol | % (m/m) | | 0.02 | | 0.02 | EN 14105 |
| | | | | | | EN 14106 |
| Total glycerol | % (m/m) | | 0.25 | | 0.23 | EN 14105 |
| Group I metals (Na + K) | mg/kg | | 5.0 | | 5.0 | EN 14108 |
| | | | | | | EN 14109 |
| Group II metals (Ca + Mg) | mg/kg | | 5.0 | | 5.0 | prEN 14538 |
| Phosphorous content | mg/kg | | 10.0 | | 10.0 | EN 14107 |

From the above data, as well as from what is already known in the field of combustibles/fuels obtained from biomasses, it appears that the mixtures according to the present invention (Bio-oil) represent a biofuel of very low environmental impact. Even when mixed with fossil diesel fuel, it does not lose its biocompatibility, but the mixture itself enhances its own positive characteristics as a function of the percentage of Bio-oil used.

The direct and indirect advantages of the biofuel include safety of use, due to its high flash-point of over 110° C., and its high biodegradability in soil or water, which is maintained in the corresponding percentage even when mixed with fossil diesel fuel.

Moreover, the biofuel mixture according to the present invention allows reducing nearly all levels of emission, also with respect to biodiesel, which already presents considerable advantages in this regard. In particular, carbon monoxide and non-combusted residues are lower because using alcohol lowers the combustion temperature, and the presence of oxygen in the alkyl ester molecule contributes to a better combustion.

The carbon dioxide produced by Bio-oil, owing to its vegetable origin, is compensated by the carbon dioxide absorbed by the plants grown for the production of the starting oil. As regards this advantageous effect, there is, for example, an average reduction of 2.5 tonnes of $CO_2$ emitted for each tonne of fossil diesel replaced.

As with other biofuels, the vegetable origin of Bio-oil guarantees the absence of heavy metals and, since it does not contain sulphur, it reduces pollutants, does not contribute to acid rain and increases the efficiency and duration of catalysts of transport vehicles and of industrial plants. There are also no aromatic polycyclic hydrocarbons, which are highly cancerogenous.

Moreover, there is a considerable decrease in mutagenicity values of PM10 fine particulate emissions, especially in the most harmful part, the carbonious one. The carbonious part is the one that is absorbed the most during respiration and is difficult to block in catalysts in industrial plants and transport vehicles.

In a different and more advantageous manner with respect to biodiesel, Bio-oil associates the known detergent and lubricant properties of alkyl ester combustibles (biodiesel) and the slightly corrosive properties of alcohols, thereby enhancing the safety, reliability and efficiency of systems. The detergent property of Bio-oil, which means a considerable reduction of industrial plant dirtying, leads to less frequent maintenance work for some components as well as greater safety and reliability owing to better system functioning.

In particular, those critical components of the apparatus that are particularly critical for efficiency are kept clean: namely, the areas where chemical reactions take place and where there is oxidation linked to energy production, as in the case of fuel cells, turbines, internal combustion engines and burners. The same beneficial detergent, lubricant and slightly corrosive effect is obtained for apparatus components where the biofuel passes through or remains in, such as nozzles, conduits, injectors, piping, tanks etc.

In short, Bio-oil has the following advantageous characteristics:
  a high flash-point of over 110° C.
  high biodegradability in soil or water, of over 99.5% after 20 years
  an average reduction of $CO_2$ emission on overall balance
  a reduction of fine particulate (PM10) of 58%; a reduction of 76% of the carbonious part of fine particulate (soot) and a resulting reduction of the mutagenicity values for the particulate.
  greater oxygen content, of about 11% with respect to fossil diesel fuel.
  no aromatic polycyclic hydrocarbons, heavy metals or sulphur.
  a 58% abatement of carbon monoxide emissions at high loads.
  a decrease in aromatic compounds of up to 68%.
  a detergent and lubricant action on system components.

The present invention has been disclosed with reference to some specific embodiments thereof, but it is to be understood that variations or modifications can be brought by persons skilled in the art without departing from the scope of the appended claims.

The invention claimed is:

1. A process for the production of biocombustible and biofuel mixtures suitable for different conditions of use, comprising:

a) pre-treating lipid-based vegetable or animal materials, wherein the lipid-based vegetable or animal materials comprises used food oil and/or animal fats and at least one of raw vegetable oil and refined vegetable oil, and wherein the pre-treatment comprises:
  i) if using the raw vegetable oil, subjecting the raw vegetable oil to a preliminary depuration and refining treatment to remove impurities and to neutralize and winterize the raw vegetable oil, and thereafter drying of the refined oil thus obtained;
  ii) if using the refined vegetable oil, subjecting the refined vegetable oil to preliminary drying; and
  iii) subjecting the used food oil and/or animal fats to a preliminary depuration treatment, drying and an esterification of the free fatty acids contained therein by addition of lower alcohols or bioalcohols to obtain an esterified product of the used food oil and/or animal fats;
b) mixing the esterified product of the used food oil and/or animal fats in a proportion of not more than 20% with dried refined oil obtained from the steps i) and/or ii);
c) producing mixtures of fatty acid alkyl esters and glycerine by transesterification of the product of step b) with lower alcohols of bioalchohols in excess; and
d) separating the mixtures obtained from the step c) of transesterification into a phase containing raw glycerine and a phase containing the mixtures of fatty acid alkyl esters and the excess amount of lower alcohols or bioalcohols;
wherein the final biocombustible and biofuel mixture contains mixtures of fatty acid alkyl esters and alcohols and/or bioalcohols, wherein the alcohols or bioalcohols are present in a calibrated quantity.

2. A process according to claim 1, wherein, after the step d) of separation, the phase containing said mixtures of fatty acid alkyl esters and the excess amount of lower alcohols or bioalcohols is subjected to a further separation treatment to remove a portion of the alcohols or bioalcohols present after the step d) of separation.

3. A process according to claim 1, wherein, after the step d) of separation, the phase containing said mixtures of fatty acid alkyl esters and said excess amount of lower alcohols or bioalcohols is not subjected to further separation treatments, and the whole excess quantity of lower alcohols or bioalcohols is kept in the final product.

4. A process according to claim 1, wherein, after the step d) of separation, an additional amount of lower alcohols or bioalcohols is added to the phase containing the mixtures of fatty acid alkyl esters and the excess lower alcohols or bioalcohols.

5. A process according to claim 1, wherein the lower alcohols or bioalcohols are selected from the group consisting of methanol, ethanol, biomethanol, bioethanol and their mixtures.

6. A process according to claim 1, wherein the step c) of transesterification is carried out with an alkaline catalyst.

7. A process according to claim 6, wherein the step c) of transesterification is carried out in three consecutive stages in which the alcohols or bioalcohols and the catalyst are dosed and recycled at every stage.

8. A process according to claim 1, wherein the preliminary treatment 1) of depuration of raw vegetable oil includes operations of centrifugation, filtration and demucilagination.

* * * * *